United States Patent [19]

Ochino

[11] Patent Number: 4,765,019
[45] Date of Patent: Aug. 23, 1988

[54] WINDSHIELD WIPER DEVICE AND METHOD OF SETTING THE SAME ON AN AUTOMOBILE

[75] Inventor: Toshiharu Ochino, Hiroshima, Japan

[73] Assignee: Mazda Motor Corporation, Japan

[21] Appl. No.: 82,542

[22] Filed: Aug. 7, 1987

[30] Foreign Application Priority Data

Aug. 9, 1986 [JP] Japan .............................. 61-122265[U]

[51] Int. Cl.$^4$ .............................................. B60S 1/04
[52] U.S. Cl. ............................... 15/250.19; 15/250.16; 29/428
[58] Field of Search ........... 15/250.16, 250.17, 250.19, 15/250.35, 250.32; 29/428

[56] References Cited

U.S. PATENT DOCUMENTS

| | | | |
|---|---|---|---|
| 2,284,844 | 6/1942 | Rappl ................................ | 15/250.19 |
| 4,345,352 | 8/1982 | Terabayashi ...................... | 15/250.19 |

FOREIGN PATENT DOCUMENTS

| | | | |
|---|---|---|---|
| 55-25609 | 2/1980 | Japan. | |
| 63551 | 4/1983 | Japan .............................. | 15/250.19 |
| 63552 | 4/1983 | Japan .............................. | 15/250.19 |
| 50854 | 3/1986 | Japan .............................. | 15/250.19 |

*Primary Examiner*—Peter Feldman
*Attorney, Agent, or Firm*—Gerald J. Ferguson, Jr.

[57] ABSTRACT

A windshield wiper device of an automobile comprises a wiper arm, a wiper blade supported by the wiper arm and having an elastic blade element for wiping a windshield, an engaging member attached to one of the wiper arm and the wiper blade and having first, second and third contacting portions, and a blade lifting member mounted on the body and having a guide portion for guiding the first contacting portion of the engaging member to run thereon, a stopper portion succeeding to the guide portion for coming into contact with the second contacting portion of the engaging member to cause the engaging member to stay at the stopper portion so that the wiper blade is lifted to keep the elastic blade element away from the windshield, and a holder portion for coming into contact with the third contacting portion of the engaging member to hold the engaging member thereby so that the wiper arm is fixed in position to lift the wiper blade from the windshield when it is mounted on the body of the automobile. Further, a method of easily setting such a windshield wiper device on the automobile is also disclosed.

15 Claims, 7 Drawing Sheets

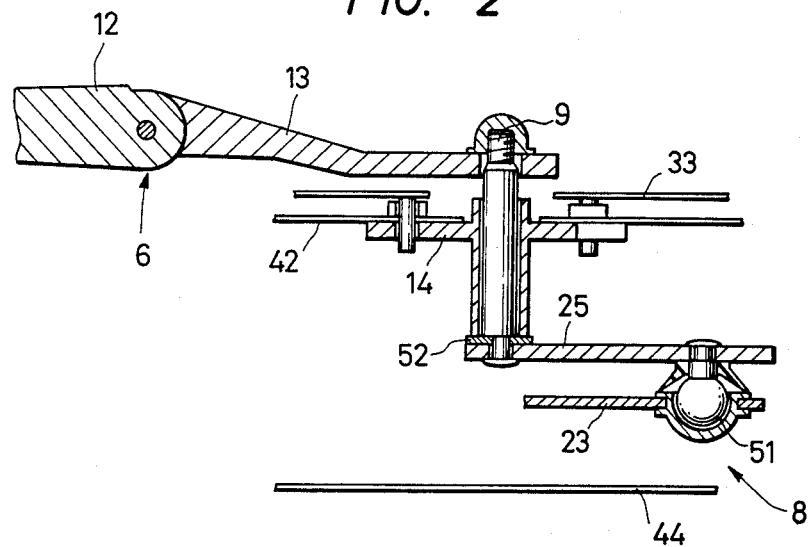
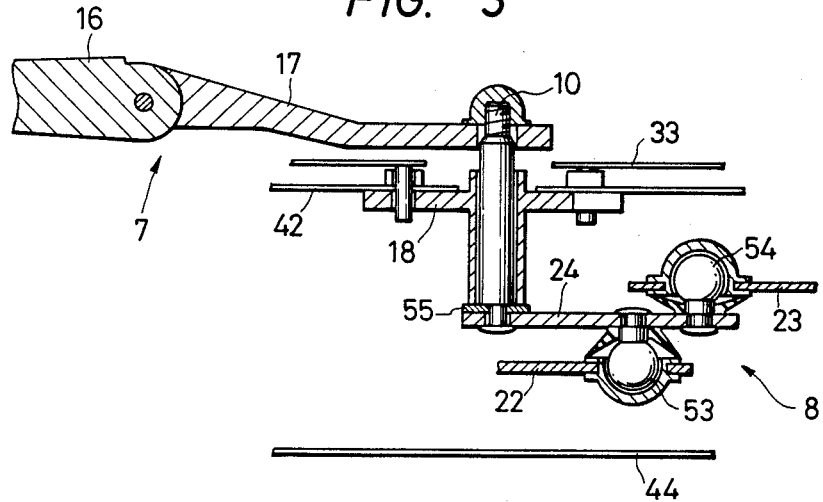

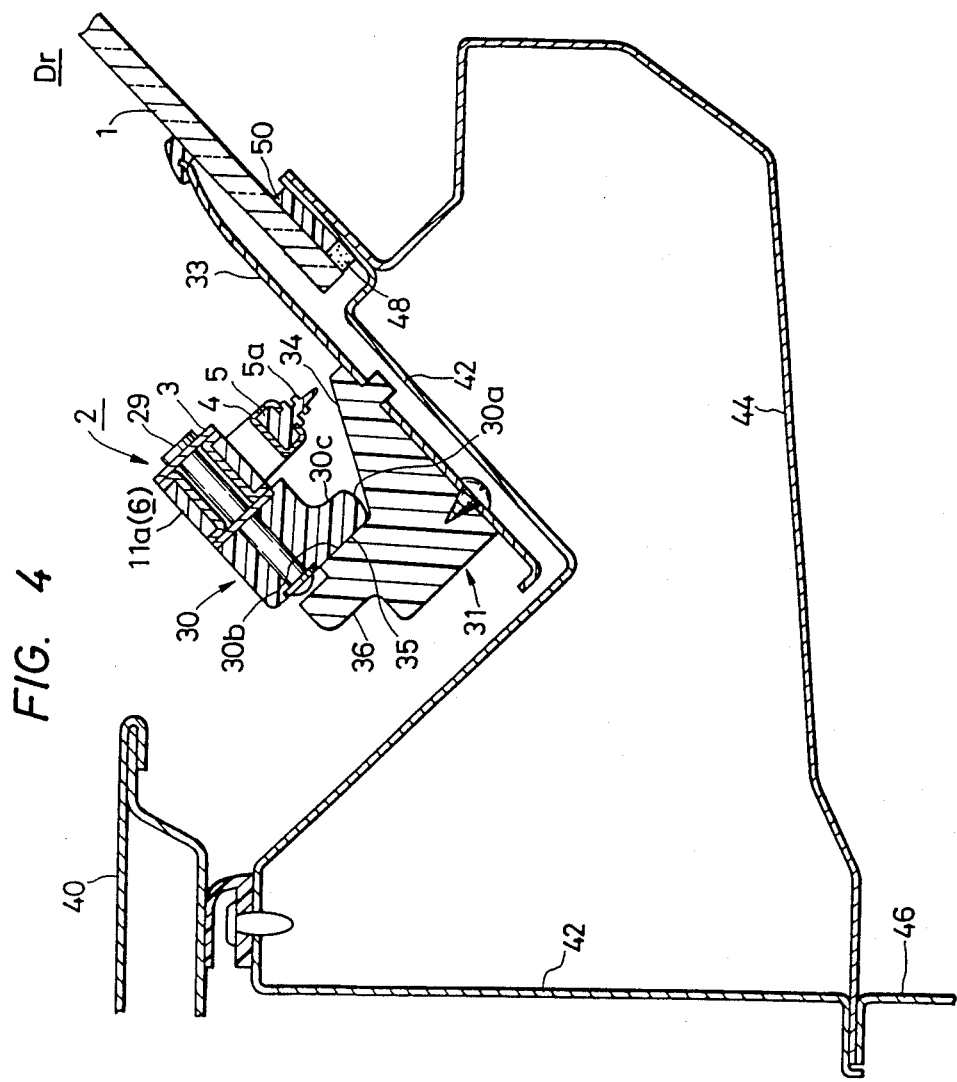

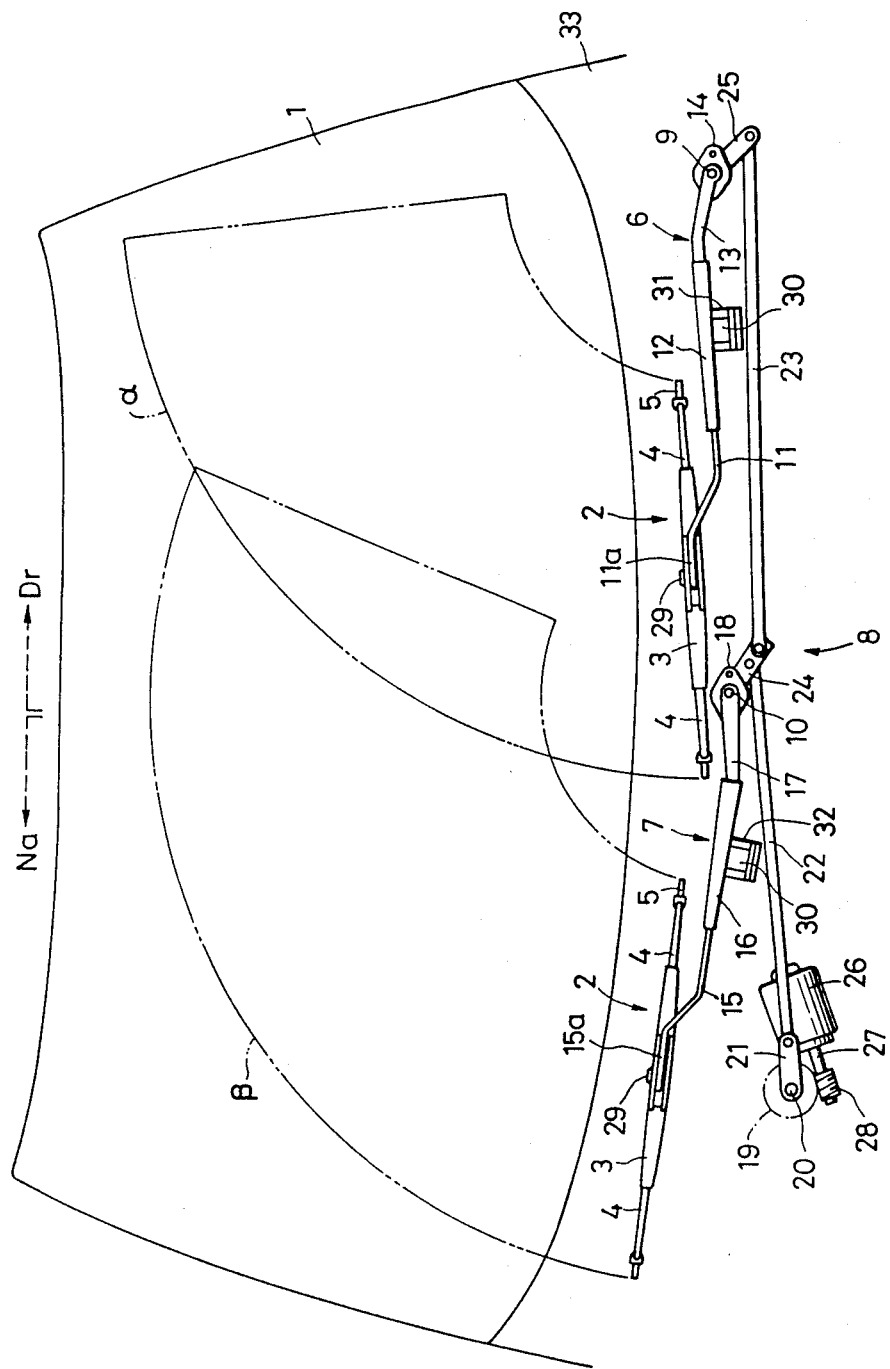

WINDSHIELD WIPER DEVICE AND METHOD OF SETTING THE SAME ON AN AUTOMOBILE

BACKGROUND OF THE INVENTION

1. Field of the Invention

The present invention relates generally to a windshield wiper device and a method of setting the same on an automobile, and more particularly, is directed to an improvement in a windshield wiper device for use in an automobile in which an elastic blade element attached to a wiper blade is prevented from coming in contact with windshield when the wiper blade stays in an inoperative position, and further to a method of easily setting the windshield wiper device improved in accordance with the invention on a body of the automobile.

2. Description of the Prior Art

There has been proposed a windshield wiper device of an automobile having a wiper blade which has an elastic blade element attached thereto and so positioned as to prevent the elastic blade element from coming in contact with a windshield in order to avoid deformation of the elastic blade element when the windshield wiper device is kept in an inoperative condition. One of such previously proposed windshield wiper devices is disclosed in, for example, the Japanese patent application published before examination under publication number 55/25609.

In the windshield wiper device thus proposed previously, a blade lifter which is provided with an arm holding portion for holding a wiper arm to which the wiper blade is supported is fixed in a space in which the wiper arm accompanied with the wiper blade is concealed, in such a manner that the wiper arm is held to lift the wiper blade supported thereby so as to keep the elastic blade element upward from the windshield when the wiper blade attached the wiper arm is concealed together with the wiper arm. With the blade lifter functioning thus, the elastic blade element is prevented from being deformed under a situation wherein the windshield wiper device is in the inoperative state.

It is necessary for the windshield wiper device provided with such a blade lifter as mentioned above that the wiper arm is so disposed as to be surely held by the arm holding portion of the blade lifter, regardless of the amount of friction resistance which occurs between the windshield and the elastic blade element wiping a surface of the windshield and is varied in accordance with a surface condition of the windshield, whenever the wiper arm is concealed. Therefore, the wiper arm is provided with torsional deflection to have a tendency to oversweep beyond the blade lifter by a positioning tool which is prepared specifically for the wiper arm when the wiper arm and the wiper blade attached to the wiper arm are mounted on a body of the automobile. Such a disposal of the wiper arm with use of the specific positioning tool results in a disadvantage on the previously proposed windshield wiper device employing the blade lifter that complicated work conducted for relatively long time is necessitated for mounting the wiper arm and the wiper blade attached to the wiper arm on the body of the automobile.

OBJECTS AND SUMMARY OF THE INVENTION

Accordingly, it is an object of the present invention to provide a windshield wiper device of an automobile which avoids the aforementioned disadvantage encountered with the prior art.

Another object of the present invention is to provide a windshield wiper device of an automobile in which an elastic blade element attached to a wiper blade for wiping a windshield actually is prevented from coming in contact with the windshield when the wiper blade stays at an inoperative position, and which is able to be set on the automobile easily without use of a specific positioning tool or the like.

A further object of the present invention is to provide a windshield wiper device which includes a blade lifting member provided for holding one of a wiper arm and a wiper blade supported by the wiper arm to lift the wiper blade so as to keep an elastic blade element attached to the wiper blade upward from the windshield when the wiper arm stays at an inoperative position, and is able to be set on the automobile easily without use of a specific positioning tool or the like.

A still further object of the present invention is to provide a method of setting a windshield wiper device on an automobile, through which such a windshield wiper device as to include a blade lifting member which is provided for holding one of a wiper arm and a wiper blade supported by the wiper arm to lift the wiper blade so as to keep an elastic blade element attached to the wiper blade upward from the windshield when the wiper arm stays at an inoperative position, can be easily set on the automobile without use of a specific positioning tool or the like.

According to the present invention, there is provided a windshield wiper device of an automobile comprising a wiper arm mounted on a body of the automobile to be swingable, a wiper blade supported by a movable end portion of the wiper arm and having an elastic blade element attached thereto for wiping a surface of a windshield, an engaging member attached to one of the wiper arm and the wiper blade and having first, second and third contacting portions, and a blade lifting member mounted on the body of the automobile and having a guide portion for guiding the first contacting portion of the engaging member to run thereon at the end of a wiping operation of the wiper blade, a stopper portion succeeding to the guide portion for coming into contact with the second contacting portion of the engaging member, which has its first contacting portion put on the guide portion, to cause the engaging member to stay thereat so that the wiper blade is lifted to keep the elastic blade element away from the surface of the windshield, and a holder portion for coming into contact with the third contacting portion of the engaging member to hold the engaging member thereby so that the wiper arm is fixed in position to lift the wiper blade from the windshield when it is mounted on the body of the automobile.

Further, there is provided a method of setting a windshield wiper device on an automobile which includes a wiper arm, a wiper blade supported by one end portion of the wiper and having an elastic blade element for wiping a surface of a windshield, an engaging member attached to one of the wiper arm and the wiper blade and having first, second and third contacting portions, and a blade lifting member mounted on a body of the automobile and having guide portion, stopper portion and holder portion, which method comprising the steps of engaging the third contacting portion of the engaging member with the holder portion of the blade lifting member so that the engaging member is held by the holder portion and thereby the wiper arm is expediently positioned to lift the wiper blade from the windshield, mounting the other end portion of the wiper arm on the body of the automobile so as to cause the wiper arm to be swingable, and disposing the engaging member to have its third contacting portion released from the holder portion of the blade lifting member, its first contacting portion put on the guide portion of the blade lifting member, and its second contacting portion being in contact with the stopper portion of the blade lifting member to cause the engaging member to stay at the stopping portion so that the wiper blade is lifted to keep the elastic blade element away from the surface of the windshield.

In the windshield wiper device and the method of setting the same on the automobile thus constituted in accordance with the present invention, the wiper arm accompanied with the wiper blade is expediently positioned by the engaging member which is held by the holder portion of the blade lifting member previously mounted on the body of the automobile when it is mounted on the body of the automobile to be swingable. Therefore, the windshield wiper device according to the present invention can be easily and surely set on the body of the automobile through simplified work without use of any specific positioning tool or the like for positioning the wiper arm.

The above, and other objects, features and advantages of the present invention will become apparent from the following detailed description which is to be read in conjunction with the accompanying drawings.

BRIEF DESCRIPTION OF THE DRAWINGS

FIGS. 2 and 3 are schematic cross-sectional views taken on lines II—II and III—III in FIG. 1, respectively;

FIGS. 4 and 6 are schematic cross-sectional views each showing a blade lifting member and a wiper arm positioned on the blade lifting member in the embodiment shown in FIG. 1;

FIG. 8 is a schematic illustration showing another embodiment of windshield wiper device of an automobile according to the present invention.

DESCRIPTION OF THE PREFERRED EMBODIMENTS

The invention will now be described by way of example with reference to the accompanying drawings.

Figure 1:
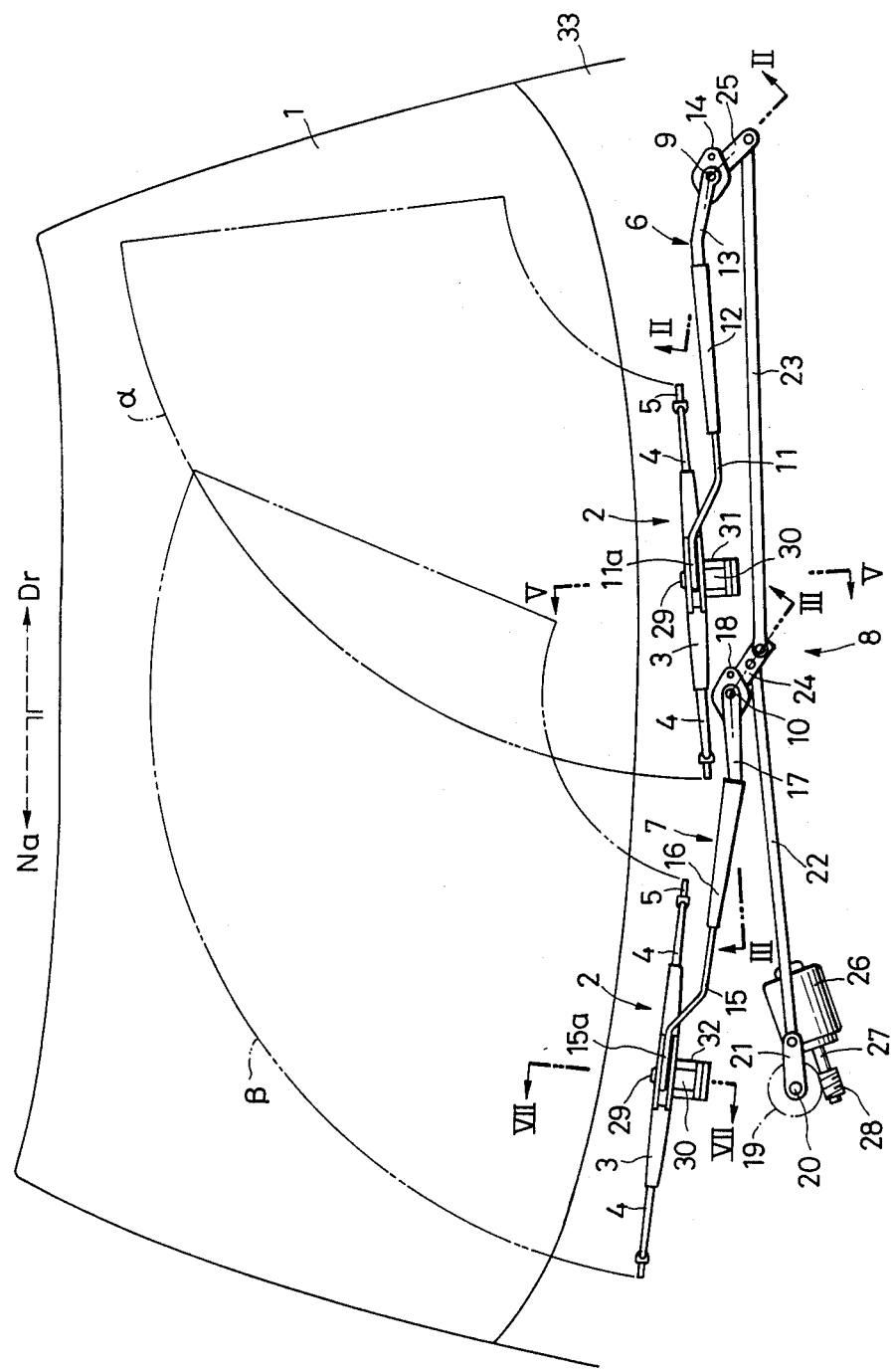
FIG. 1 is a schematic illustration showing one embodiment of windshield wiper device of an automobile according to the present invention.

FIG. 1 shows one embodiment of windshield wiper device of an automobile according to the present invention.

Referring to FIG. 1, a pair of wiper blades 2 are provided for making a wiping area α on a windshield 1 at a driver's seat side Dr and another wiping area β on the windshield 1 at a navigator's seat side Na, respectively. The windshield 1 is mounted on a body of an automobile and a windshield molding panel 33 forming a part of the body is provided to cover a lower end portion of the windshield 1. Each of the wiper blades 2 comprises a primary lever 3, a pair of secondary levers 4 connected to both end portions of the primary lever 3, and an elastic blade element 5, such as a blade rubber, attached to both of the secondary levers 4. The elastic blade element 5 is caused to come into contact with a surface of the windshield 1 for wiping the same actually.

The wiper blade 2 at the driver's seat side Dr is supported by a wiper arm 6 which is coupled with a wiper arm spindle 9 at one end portion of the body in a direction of the width of the body, and similarly the wiper blade 2 at the navigator's seat side Na is supported by a wiper arm 7 which is coupled with a wiper arm spindle 10 at a central portion of the body in the direction of the width of the body. The wiper arm spindles 9 and 10 are interconnected through a link mechanism 8.

The wiper arm 6 is composed of an arm piece portion 11 having one end 11a thereof connected to a central portion of the primary lever 3, an arm head portion 13 and a retainer portion 12 interconnecting therethrough the arm piece portion 11 and the arm head portion 13. As shown in FIG. 2, one end of the arm head portion 13 is fixed on the wiper arm spindle 9 which is supported to be rotatable by a spindle holder 14 fixed to a part of the body formed with the windshield molding panel 33 and a cowl panel 42.

Similarly, the wiper arm 7 is composed of an arm piece portion 15 having one end 15a thereof connected to a central portion of the primary lever 3, an arm head portion 17 and a retainer portion 16 interconnecting therethrough the arm piece portion 15 and the arm head portion 17. As shown in FIG. 3, one end of the arm head portion 17 is fixed on the wiper arm spindle 10 which is supported to be rotatable by a spindle holder 18 fixed to a part of the body formed with the windshield molding panel 33 and the cowl panel 42.

Each of the wiper arm spindles 9 and 10 is rotated to reciprocate by the link mechanism 8. The link mechanism 8 comprises a rotary link 21 fixed on an axis 20 of a worm wheel 19, a first swinging link 24 connected to the wiper arm spindle 10, a second swinging link 25 connected to the wiper arm spindle 9, a first link rod 22 connected between the rotary link 21 and the first swinging link 24, and a second link rod 23 connected between the first and second swinging links 24 and 25. The worm wheel 19 is driven by a worm gear 28 fixed on a rotary shaft 27 of a motor 26, so that the first and second swinging links 24 and 25 are moved to reciprocate.

As shown in FIG. 2, one end portion of the second swinging link 25 is secured through a spacer 52 to a lower end portion of the wiper arm spindle 9 and the other end portion of the second swinging link 25 is coupled through a ball joint 51 with one end portion of the second link rod 23, so that the second swinging link 25 is caused to swing by movements of the second link rod 23 so as to rotate the wiper arm spindle 9. Further, as shown in FIG. 3, one end portion of the first swinging link 24 is secured through a spacer 55 to a lower end portion of the wiper arm spindle 10, the other end portion of the first swinging link 24 is coupled through a ball joint 54 with the other end portion of the second link rod 23, and a portion between both end portions of the first swinging link 24 is coupled through a ball joint 53 with one end portion of the first link rod 22, so that the first swinging link 24 is caused to swing by movements of the first link rod 22 so as to rotate the wiper arm spindle 10 and further to move the second link rod 23. With the rotations of the wiper arm spindles 9 and 10 thus caused, the wiper blades 2 operate to make the wiping area α on the windshield 1 at the driver's seat side Dr and the wiping area β on the windshield 1 at the navigator's seat side Na, respectively.

Incidentally, an upper dash panel 44 which is disposed below the link mechanism 8 for constituting partially the body of the automobile is shown in each of FIGS. 2 and 3.

Figure 6:
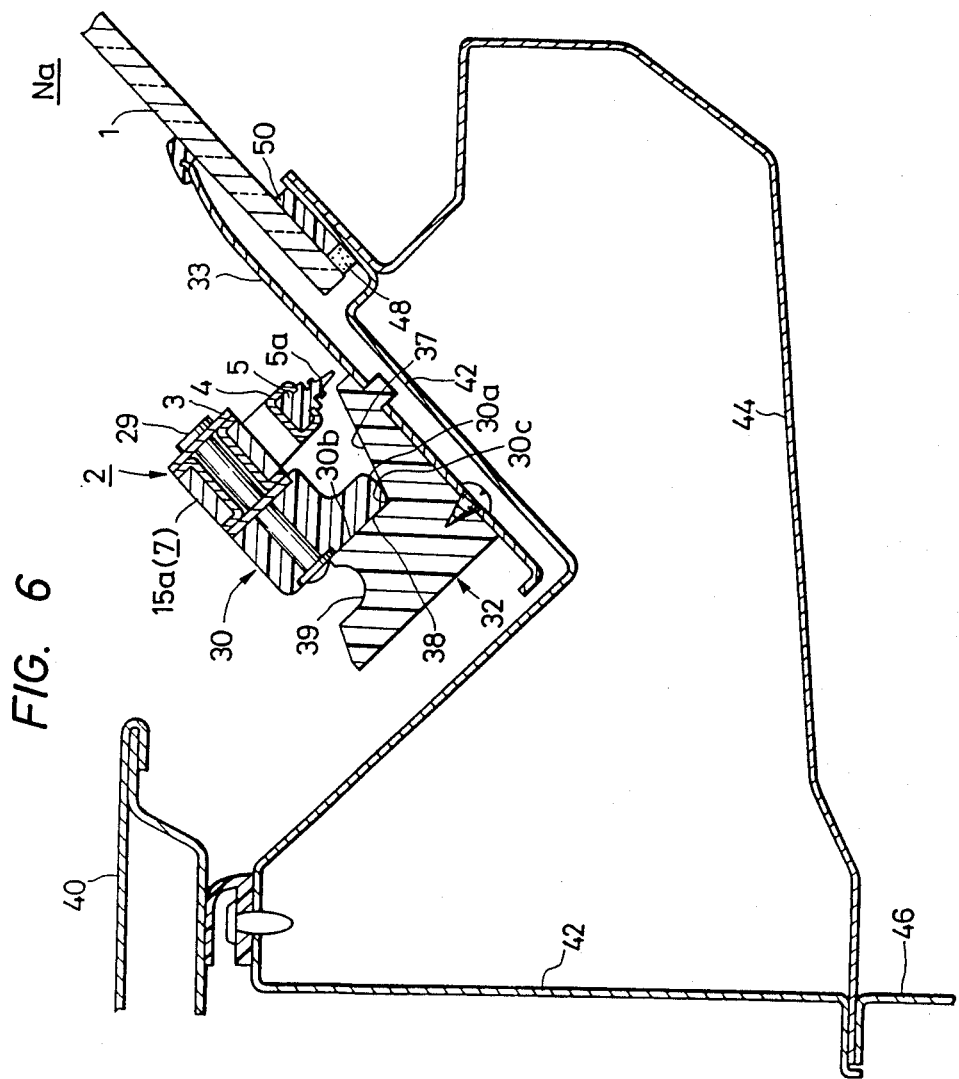

As shown in FIGS. 1, 4 and 6, an engaging member 30 is attached through a pin 29 to the central portion of the primary level 3 of each of the wiper blades 2, and blade lifting members 31 and 32 are mounted on the windshield molding panel 33 so as to engage with the engaging members 30 attached to the wiper blades 2 at the driver's seat side Dr and the navigator's seat side Na, respectively. One of the pins 29 is used for securing together one end 11a of the arm piece portion 11 of the wiper arm 6, the central portion of the primary lever 3 of the wiper blade 2 and the engaging member 30 at a junction where the wiper arm 6 and the wiper blade 2 are connected with each other, as shown in FIG. 4. Further, the other of the pins 29 is used for securing together one end 15a of the arm piece portion 15 of the wiper arm 7, the central portion of the primary lever 3 of the wiper blade 2 and the engaging member 30 at a junction where the wiper arm 7 and the wiper blade 2 are connected with each other, as shown in FIG. 6.

The windshield molding panel 33 is disposed to cover a portion of the cowl panel 42 in addition to the lower end portion of the windshield 1 which is fixed through a spacer 50 and a layer of adhesive agent 48 on a read end portion of the cowl panel 42. The cowl panel 42 is connected at its rear end portion with a rear end portion of the upper dash panel 44 and also at its front end portion with a front end portion of the upper dash panel 44 to which an upper end portion of an upper dash panel 46 is connected. Further, a rear end portion of a hood 40 covering an engine (not shown in the drawings) is put on the cowl panel 42.

Referring to FIG. 4, the engaging member 30 which is attached to the wiper blade 2 supported by the wiper arm 6 at the driver's seat side Dr has first, second and third contacting portions 30a, 30b and 30c formed in a body, and the blade lifting member 31 which is mounted on the windshield molding panel 33 at the driver's seat side Dr has a guide portion 34 provided with an inclined surface for guiding the first contacting portion 30a of the engaging member 30 to run thereon in the end of a wiping operation of the wiper blade 2, a stopper portion 35 succeeding to the guide portion 34 for coming into contact with the second contacting portion 30b of the engaging member 30 having the first contacting portion 30a put on the guide portion 34 to cause the engaging member 30 to stay thereat so that the wiper blade 2 is lifted to keep an edge 5a of the elastic blade element 5 away from the surface of the windshield 1, and a holder portion 36 for coming into contact with the third contacting portion 30c of the engaging member 30 to hold the engaging member 30 thereby so that the wiper arm 6 is fixed in position to lift the wiper blade 2 from the windshield 1 when it is mounted on the body of the automobile. The guide, stopper and holder portions 34, 35 and 36 of the blade lifting member 31 are also formed in a body.

While, referring to FIG. 6, the engaging member 30 which is attached to the wiper blade 2 supported by the wiper arm 7 at the navigator's seat side Na has also first, second and third contacting portions 30a, 30b and 30c formed in a body, and the blade lifting member 32 which is mounted on the windshield molding panel 33 at the navigator's seat side Na has a guide portion 37 provided with an inclined surface for guiding the first contacting portion 30a of the engaging member 30 to run thereon in the end of the wiping operation of the wiper blade 2, a stopper portion 38 succeeding to the guide portion 37 for coming into contact with the second contacting portion 30b of the engaging member 30 having the first contacting portion 30a put on the guide portion 37 to cause the engaging member 30 to stay thereat so that the wiper blade 2 is lifted to keep an edge 5a of the elastic blade element 5 away from the surface of the windshield 1, and a holder portion 39 for coming into contact with the third contacting portion 30c of the engaging member 30 to hold the engaging member 30 thereby so that the wiper arm 7 is fixed in position to lift the wiper blade 2 from the windshield 1 when it is mounted on the body of the automobile. The guide, stopper and holder portions 37, 38 and 39 of the blade lifting member 32 are also formed in a body.

Figure 5:
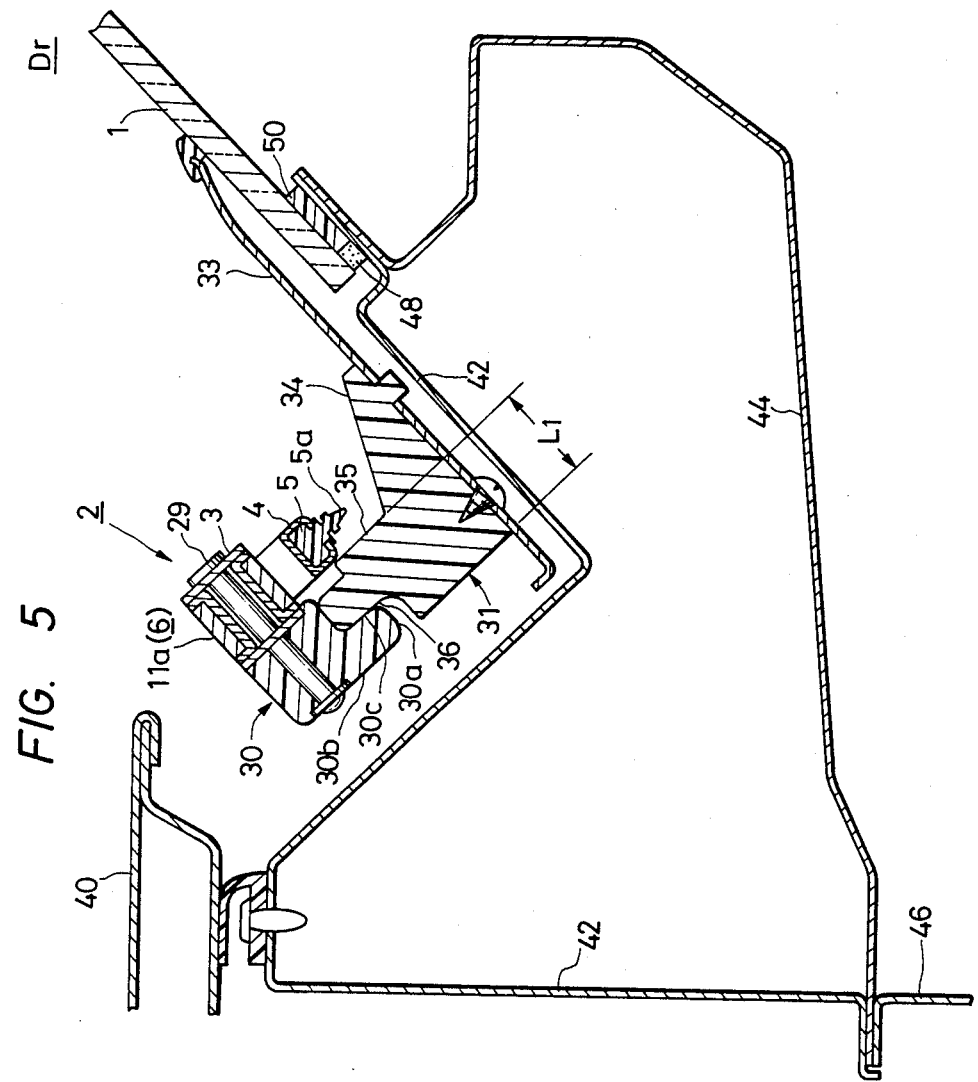
FIGS. 5 and 7 are schematic cross-sectional views taken on lines V—V and VII—VII in FIG. 1.
Figure 7:
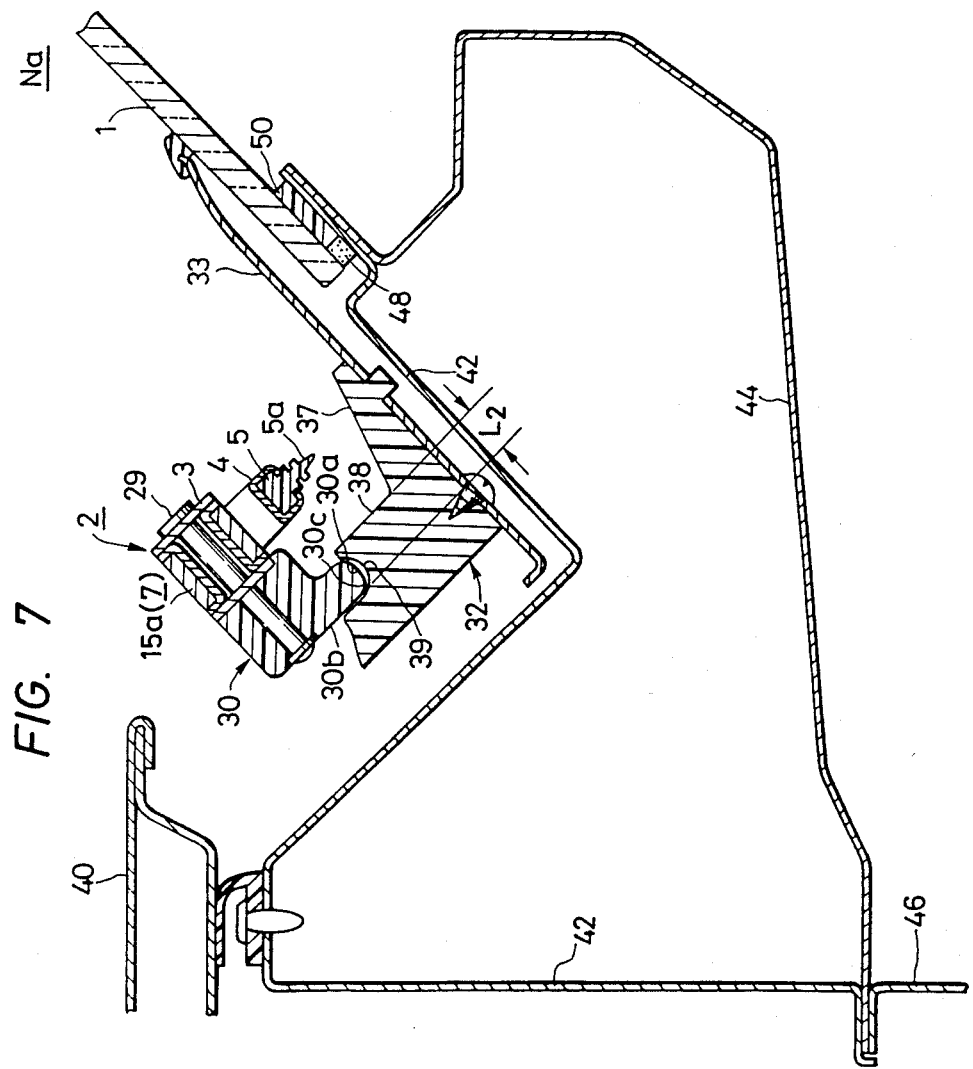

FIG. 5 shows a situation in which the engaging member 30 which is attached to the wiper blade 2 supported by the wiper arm 6 at the driver's seat side Dr is held by the holder portion 36 of the blade lifting member 31 so that the wiper arm 6 is fixed in position to lift the wiper blade 2 from the windshield 1, and similarly, FIG. 7 shows a situation in which the engaging member 30 which is attached to the wiper blade 2 supported by the wiper arm 7 at the navigator's seat side Na is held by the holder portion 39 of the blade lifting member 32 so that the wiper arm 7 is fixed in position to lift the wiper blade 2 from the windshield 1. A distance $L_2$ from the stopper portion 38 of the blade lifting member 32 to the second contacting portion 30b of the engaging member 30, which forms an outer surface of the engaging member 30, secured to the wiper arm 7 under the situation in which the engaging member 30 secured to the wiper arm 7 is held by the holder portion 39 of the blade lifting member 32, as shown in FIG. 7, is selected to be shorter than a distance $L_1$ from the stopper portion 35 of the blade lifting member 31 to the second contacting portion 30b of the engaging member 30, which forms an outer surface of the engaging member 30, secured to the wiper arm 6 under the situation in which the engaging member 30 secured to the wiper arm 6 is held by the holder portion 36 of the blade lifting member 31, as shown in FIG. 5. Accordingly, the wiper arm 7 accompanied with the engaging member 30 held by the holder portion 39 of the blade lifting member 32 is provided with a torsional deflection less than that exerted on the wiper arm 6 accompanied with the engaging member 30 held by the holder portion 36 of the blade lifting member 31.

The embodiment of windshield wiper device according to the present invention constituted as described above is set on the body of the automobile through the following steps.

First, the blade lifting members 31 and 32 are mounted on the windshield molding panel 33 at the driver's seat side Dr and the navigator's seat side Na, respectively, prior to mounting of the wiper arms 6 and 7. Then, the wiper arm 6 is mounted on the body of the automobile at the driver's seat side Dr. In the mounting of the wiper arm 6, the third contacting portion 30c of the engaging member 30 secured to the wiper arm 6 is caused to engage with the holder portion 36 of the blade lifting member 31 so that the engaging member 30 secured to the wiper arm 6 is held by the holder portion 36 and thereby the wiper arm 6 is expediently positioned to lift the wiper blade 2 supported thereby from the windshield 1, as shown is FIG. 5. After that, the arm head portion 13 of the wiper arm 6 is fixed on the wiper arm spindle 9 planted previously on the cowl panel 42 as shown in FIG. 2 so as to cause the wiper arm 6 to be swingable. Then, the engaging member 30 secured to the wiper arm 6 is disposed to stay on the blade lifting member 31 with its third contacting portion 30c released from the holder portion 36 of the blade lifting member 31, its first contacting portion 30a put on the guide portion 34 of the blade lifting member 31, and its second contacting portion 30b being in contact with the stopper portion 35 of the blade lifting member 31, as shown in FIG. 4. The wiper arm 6 is kept in such a condition that the second contacting portion 30b of the engaging member 30 secured to the wiper arm 6 is in contact with the stopper portion 35 of the blade lifting member 31 by a torsional reaction of the wiper arm spindle 9.

Next, the wiper arm 7 is mounted on the body of the automobile at the navigator's seat side Na. In the mounting of the wiper arm 7, the engaging member 30 secured to the wiper arm 7 is held by the holder portion 39 and thereby the wiper arm 7 is expediently positioned to lift the wiper blade 2 supported thereby from the windshield 1, as shown is FIG. 7. After that, the arm head portion 17 of the wiper arm 7 is fixed on the wiper arm spindle 10 planted previously on the cowl panel 42 as shown in FIG. 3 so as to cause the wiper arm 7 to be swingable. Then, the engaging member 30 secured to the wiper arm 7 is disposed to stay on the blade lifting member 32 with its third contacting portion 30c released from the holder portion 39 of the blade lifting member 32, its first contacting portion 30a put on the guide portion 37 of the blade lifting member 32, and its second contacting portion 30b being in contact with the stopper portion 38 of the blade lifting member 32, as shown in FIG. 6. The wiper arm 7 is kept in such a condition that the second contacting portion 30b of the engaging member 30 secured to the wiper arm 7 is in contact with the stopper portion 38 of the blade lifting member 32 by a torsional reaction of the wiper arm spindle 10.

In such a case, the reason why the wiper arm 6 is mounted prior to the mounting of the wiper arm 7 is that, if the wiper arm 7 were mounted first, the engaging member 30 secured to the wiper arm 6 is prevented from being held by the holder portion 36 by the wiper blade 2 supported by the wiper arm 6 and coming into contact with the arm head portion 17 of the wiper arm 7 secured to the wiper arm spindle 10 and thereby the wiper arm 6 can not be positioned expediently to lift the wiper blade 2 supported thereby from the windshield 1 on the occasion of the mounting of the wiper arm 6.

As described above, the wiper arms 6 and 7 each accompanied with the wiper blade 2 and the engaging member 30 can be easily and surely mounted on the body of the automobile without use of any specific positioning tool or the like. Besides, since the wiper arms 6 and 7 mounted in such a manner as aforementioned are subjected to the torsional reactions of the wiper arm spindles 9 and 10, respectively, the engaging members 30 secured to the wiper arms 6 and 7 engage surely and properly with the blade lifting members 31 and 32, respectively, so that the wiper arms 6 and 7 are surely disposed to lift the respective wiper blades 2 and thereby to keep the edges 5a of the elastic blade elements 5 attached to the wiper blades 2 upward from the windshield 1 at the end of the wiping operation of each of the wiper blades 2, regardless of the amount of friction resistance which occurs between the windshield 1 and each of the elastic blade elements 5 and is varied in accordance with a surface condition of the windshield 1. Consequently, the elastic blade element 5, which is attached to the wiper blade 2 supported by each of the wiper arms 6 and 7, is prevented effectively from being deformed due to continuous contact with the windshield 1.

FIG. 8 shows another embodiment of windshield wiper device of an automobile according to the present invention.

In FIG. 8, elements, members and parts corresponding to those of FIG. 1 are marked with the same references. In the embodiment shown in FIG. 8, engaging members 30 are fixed directly to wiper arms 6 and 7, instead of wiper blades 2, respectively, and blade lifting members 31 and 32 are disposed on the windshield molding panel 33 so as to correspond in position with the engaging members 30 secured to the wiper arms 6 and 7, respectively. To be concrete, the engaging members 30 are attached to a retainer portion 12 interconnecting therethrough an arm piece portion 11 and an arm head portion 13 of the wiper arm 6 and a retainer portion 16 interconnecting therethrough an arm piece portion 15 and an arm head portion 17 of the wiper arm 7, respectively. Other portions of this embodiment are constituted in the same manner as those in the embodiment shown in FIG. 1.

The embodiment shown in FIG. 8 is also set on the body of the automobile through the same steps as described above in connection with the embodiment shown in FIG. 1. Further, with the embodiment shown in FIG. 8, operations and advantages corresponding to those of the embodiment shown in FIG. 1 are obtained.

What is claimed is:

1. A windshield wiper device of an automobile comprising,
    a wiper arm mounted on a body of the automobile to be swingable,
    a wiper blade supported by a movable end portion of said wiper arm and having an elastic blade element attached thereto for wiping a surface of a windshield,
    an engaging member attached to one of said wiper arm and said wiper blade and having first, second and third contacting portions, and
    a blade lifting member mounted on the body of the automobile and having a guide portion for guiding the first contacting portion of said engaging member to run thereon at the end of a wiping operation of said wiper blade, a stopper portion succeeding to the guide portion for coming into contact with the second contacting portion of said engaging member to cause said engaging member to stay at said stopper portion so that said wiper blade is lifted to keep the elastic blade element away from the surface of the windshield, and a holder portion for coming into contact with the third contacting portion of said engaging member to hold said engaging member thereby so that said wiper arm is fixed in position to lift said wiper blade from the windshield when it is mounted on the body of the automobile.

2. A windshield wiper device according to claim 1, wherein said engaging member is attached to said wiper blade around a junction at which said wiper arm and said wiper blade are connected with each other.

3. A windshield wiper device according to claim 2, wherein said engaging member is secured together with an end portion of said wiper arm to said wiper blade by a common fastening member.

4. A windshield wiper device according to claim 3, wherein said wiper blade comprises a primary lever connected to said wiper arm, at least two secondary levers disposed at both end portions of said primary lever, and the elastic blade element attached to said secondary levers.

5. A windshield wiper device according to claim 4, wherein said wiper arm is connected at its one end to a central portion of said primary lever.

6. A windshield wiper device according to claim 5, wherein said guiding portion of the blade lifting member has a inclined plane extending from an end portion of the blade lifting member to said stopper portion of the blade lifting member.

7. A windshield wiper device according to claim 1, wherein said wiper arm comprises an arm piece portion having one end thereof connected to said wiper blade, an arm head portion having one end thereof connected to a link mechanism mounted on the body of the automobile, and a retainer portion for interconnecting therethrough the other end of said arm piece portion and the other end of said arm head portion.

8. A windshield wiper device according to claim 7, wherein said engaging member is attached to said retainer portion of the wiper arm.

9. A windshield wiper device according to claim 1, wherein said wiper arm, wiper blade, engaging member and blade lifting member are arranged to form a first composite group provided at a driver's seat side on the body of the automobile, and a second composite group comprising an additional wiper arm, an additional wiper blade having first, second and third contacting portions, and an additional blade lifting member having a guide portion, a stopper portion and a holder portion, which correspond respectively to said wiper arm, wiper blade, engaging member and blade lifting member forming said first composite group, is further provided at a navigator's seat side on the body of the automobile.

10. A windshield wiper device according to claim 9, wherein a distance from the stopper portion of said additional blade lifting member to the second contacting portion of said additional engaging member under a situation in which said additional engaging member is held by the holder portion of said additional blade lifting member in said second composite group is selected to be shorter than a distance from the stopper portion of said blade lifting member to the second contacting portion of said engaging member under a situation in which said engaging member is held by the holder portion of said blade lifting member in said first composite group.

11. A windshield wiper device according to claim 10, wherein one end portion of said wiper arm in said first composite group is connected to a link mechanism mounted on the body of the automobile at one end portion of said body in a direction of the width of said body, and one end portion of said additional wiper arm in said second composite group is connected to said link mechanism at a central portion of said body in the direction of the width of said body.

12. A windshield wiper device according to claim 11, wherein said link mechanism comprises a rotary link fixed on an axis of a worm wheel, a first swinging link connected to a first wiper arm spindle planted on said body to be rotatable and coupled with one end portion of said additional wiper arm, a second swinging link connected to a second wiper arm spindle planted on said body to be rotatable and coupled with one end portion of said wiper arm, a first link rod connected between said rotary link and said second swinging link, and a second link rod connected between the first and second swinging links.

13. A windshield wiper device according to claim 12, wherein said worm wheel is driven by a worm gear fixed on a rotary shaft of a motor.

14. A windshield wiper device according to claim 1, wherein said engaging member has said first, second and third contacting portions formed in a body, and said blade lifting member has said guide portion, stopper portion and holder portion formed in a body.

15. A method of setting a windshield wiper device on an automobile which includes a wiper arm, a wiper blade supported by one end portion of the wiper arm and having an elastic blade element for wiping a surface of a windshield, an engaging member attached to one of the wiper arm and the wiper blade and having first, second and third contacting portions, and a blade lifting member mounted on a body of the automobile and having guide portion, stopper portion and holder portion, which method comprising the steps of, engaging the third contacting portion of said engaging member with the holder portion of said blade lifting member so that said engaging member is held by said holder portion and thereby said wiper arm is expediently positioned to lift said wiper blade from the windshield, mounting the other end portion of said wiper arm on the body of the automobile so as to cause the said wiper arm to be swingable, and disposing said engaging member to have its third contacting portion released from the holder portion of said blade lifting member, its first contacting portion put on the guide portion of said blade lifting member, and its second contacting portion being in contact with the stopper portion of said blade lifting member to cause said engaging member to stay at the stopping portion so that said wiper blade is lifted to keep the elastic blade element away from the surface of the windshield.

* * * * *